(12) United States Patent
Bagnell et al.

(10) Patent No.: US 12,444,247 B1
(45) Date of Patent: Oct. 14, 2025

(54) ESTIMATING AUTONOMOUS VEHICLE PERFORMANCE METRICS IN REAL WORLD FROM SIMULATION SCENARIOS

(71) Applicant: Aurora Operations, Inc., Mountain View, CA (US)

(72) Inventors: James Andrew Bagnell, Pittsburgh, PA (US); Juan Pablo Mendoza, San Francisco, CA (US); Arun Venkatraman, Mountain View, CA (US); Paul Vernaza, Sunnyvale, CA (US)

(73) Assignee: Aurora Operations, Inc., Pittsburgh, PA (US)

( * ) Notice: Subject to any disclaimer, the term of this patent is extended or adjusted under 35 U.S.C. 154(b) by 397 days.

(21) Appl. No.: 17/887,358

(22) Filed: Aug. 12, 2022

(51) Int. Cl.
*G07C 5/08* (2006.01)
*G05D 1/00* (2024.01)

(52) U.S. Cl.
CPC ............. *G07C 5/08* (2013.01); *G05D 1/0088* (2013.01); *G05D 1/0221* (2013.01)

(58) Field of Classification Search
CPC ....... G07C 5/08; G05D 1/0088; G05D 1/0221
See application file for complete search history.

(56) References Cited

U.S. PATENT DOCUMENTS

| | | | |
|---|---|---|---|
| 11,940,793 B1* | 3/2024 | Kavalar | B60W 60/00 |
| 2020/0339109 A1* | 10/2020 | Hong | G01S 13/86 |
| 2021/0347372 A1* | 11/2021 | Bagschik | G06V 20/56 |
| 2022/0048533 A1* | 2/2022 | ?Dblom | G06F 11/3664 |
| 2022/0066456 A1* | 3/2022 | Ebrahimi Afrouzi | G06F 3/04883 |
| 2023/0222268 A1* | 7/2023 | Muehlenstaedt | G05D 1/0217 703/1 |

* cited by examiner

*Primary Examiner* — James J Lee
*Assistant Examiner* — Alexander George Matta
(74) *Attorney, Agent, or Firm* — Patent Law Works LLP

(57) ABSTRACT

Evaluating the performance of an autonomous vehicle includes determining a plurality of simulation scenarios, determining a set of features correlated to a performance metric of interest for the autonomous vehicle, executing a simulation for each simulation scenario in the plurality of simulation scenarios, determining, by a machine learning model, a weight for each simulation scenario in the set of simulation scenarios subject to a constraint that a simulated expected value of each feature in the plurality of simulation scenarios falls within a threshold range of an observed expected value of each feature in an operation design domain of interest of the autonomous vehicle, and estimating an expected value of the performance metric of interest of the autonomous vehicle based on the determined weight and the execution of the simulation for each simulation scenario in the plurality of simulation scenarios.

20 Claims, 7 Drawing Sheets

ESTIMATING AUTONOMOUS VEHICLE PERFORMANCE METRICS IN REAL WORLD FROM SIMULATION SCENARIOS

BACKGROUND

A challenge to autonomous vehicle technology arises in evaluating the performance of different subsystems of the autonomous vehicle under a wide variety of driving circumstances in the real world. Practically, the different subsystems of the autonomous vehicle may be evaluated on a plurality of simulated scenarios that attempt to mimic the real world. For example, the perception or planning subsystems in an autonomous vehicle may be evaluated on simulated scenarios to determine whether the autonomous vehicle is navigating appropriately through the environment. There exists a persistent need for a technique to estimate the performance metrics of autonomous vehicles in the real world based on their behavior measured in the simulated scenarios.

SUMMARY

The present disclosure describes techniques for estimating the value of performance metrics of an autonomous vehicle based on their behavior in the simulated scenarios. One existing approach for estimating the value of performance metrics is to directly test the performance of the autonomous vehicle in the real world. However, this approach is prohibitively expensive and an inefficient process as the performance data of the autonomous vehicle needs to be collected over millions of miles of actual autonomous driving. Another existing approach is to use the simulation scenarios for validating and verifying the performance of the autonomous vehicle. However, the simulation scenarios are typically built against failure points or as hedges against difficult or rare events encountered in the real world. Therefore, the performance of the autonomous vehicle in the simulation may not give a realistic estimate of the performance of the autonomous vehicle in the real world. The present disclosure is particularly advantageous for estimating the performance metrics of an autonomous vehicle because density ratio estimation facilitates determining how well the distribution of events covered by a representative set of simulation scenarios matches the distribution of events expected in real-world driving and reweighting the measurements from the corresponding simulation runs with respect to their exposure in the real-world driving. For example, the density ratio estimation approach may be used to estimate how over-represented a particular simulation scenario is with respect to the real world. One implementation of the density ratio estimation approach is using maximum entropy modeling.

This specification relates to methods and systems for validating a performance of an autonomous vehicle in the real world based on a set of simulation scenarios. According to one aspect of the subject matter described in this disclosure, a method includes determining the plurality of simulation scenarios (or structured tests), determining a set of features correlated to a performance metric of interest for the autonomous vehicle, executing a simulation for each simulation scenario in the plurality of simulation scenarios, determining, by a machine learning model, a weight for each simulation scenario in the plurality of simulation scenarios subject to a constraint that a simulated expected value of each feature in the plurality of simulation scenarios falls within a threshold range of an observed expected value of each feature in an operational design domain (ODD) of interest of the autonomous vehicle, and estimating an expected value of the performance metric of interest of the autonomous vehicle based on the determined weight and the execution of the simulation for each simulation scenario in the plurality of simulation scenarios.

In general, another aspect of the subject matter described in this disclosure includes a system comprising one or more processors and memory operably coupled with the one or more processors, wherein the memory stores instructions that, in response to the execution of the instructions by one or more processors, cause the one or more processors to perform operations including determining the plurality of simulation scenarios, determining a set of features correlated to a performance metric of interest for the autonomous vehicle, executing a simulation for each simulation scenario in the plurality of simulation scenarios, determining, by a machine learning model, a weight for each simulation scenario in the plurality of simulation scenarios subject to a constraint that a simulated expected value of each feature in the plurality of simulation scenarios falls within a threshold range of an observed expected value of each feature in an ODD of interest of the autonomous vehicle, and estimating an expected value of the performance metric of interest of the autonomous vehicle based on the determined weight and the execution of the simulation for each simulation scenario in the plurality of simulation scenarios.

Other implementations of one or more of these aspects include corresponding systems, apparatus, and computer programs, configured to perform the actions of the methods, encoded on computer storage devices.

These and other implementations may each optionally include one or more of the following aspects. For instance, the method further comprises determining a set of logged data snippets of real world driving data, executing a simulation based on the set of logged data snippets, and determining the observed expected value of each feature in the set of features in the ODD of interest based on the execution of the simulation. In another instance, the method may further include estimating confidence intervals of the expected value of the performance metric of interest of the autonomous vehicle using one from a group of variance estimation, central limit theorem, and Hoeffding's inequality. For instance, the aspects may also include that estimating the expected value of the performance metric of interest of the autonomous vehicle includes estimating the performance metric of interest of the autonomous vehicle from the execution of the simulation for each simulation scenario in the plurality of simulation scenarios, and weighting the estimated performance metric of interest using the determined weight for each simulation scenario in the plurality of simulation scenarios. For instance, the aspects may also include that determining the weight for each simulation scenario in the plurality of simulation scenarios subject to the constraint includes maximizing an entropy of weight distribution over the plurality of simulation scenarios by the machine learning model. For instance, the aspects may also include that determining the weight for each simulation scenario in the plurality of simulation scenarios subject to the constraint includes determining, by the machine learning model, the weight for each simulation scenario in the plurality of simulation scenarios subject to the constraint that a simulated rate of occurrence of each feature in the plurality of simulation scenarios falls within a threshold range of an observed rate of occurrence of each feature in the ODD of interest of the autonomous vehicle. For example, the aspects may further include that the threshold range of the observed expected value of each feature in the ODD of interest of the autonomous vehicle is based on uncertainty bounds corresponding to each feature. In another example, the aspects may further include that the weight for each simulation scenario is a function of one or more features of each simulation scenario. In another example, the aspects may further include that a feature in the set of features is a grouping of attributes associated with one or more of a simulation scenario and a logged data snippet of the real world driving data. In another example, the aspects may further include that the grouping of attributes associated with one or more of the simulation scenario and the logged data snippet of the real world driving data includes one or more of an operating environment, a vehicle maneuver, and an actor.

BRIEF DESCRIPTION OF THE DRAWINGS

These and other aspects and features of the present implementations will become apparent upon review of the following description of specific implementations in conjunction with the accompanying figures, wherein.

DETAILED DESCRIPTION

Overview

Figure 1:
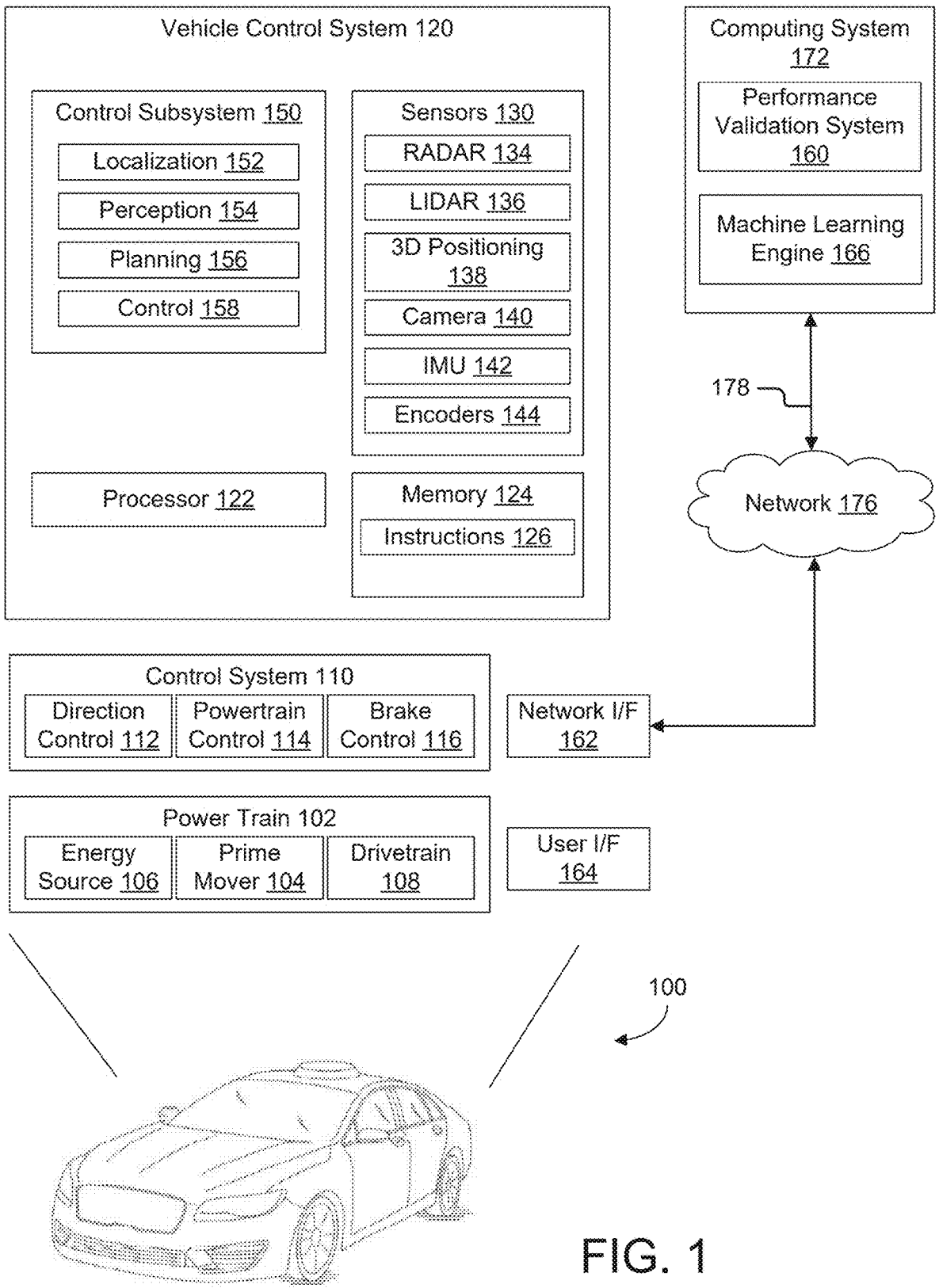
FIG. 1 is a block diagram illustrating an example hardware and software environment for an autonomous vehicle according to some implementations.

In the following disclosure, a performance validation system 160 is used to validate the performance of an autonomous vehicle (AV) in an operational design domain (ODD) based on a set of simulation scenarios. The ODD may be a definition or description of the specific environment in which an automated function or system is designed to operate, including but not limited to roadway types, speed range, environmental conditions, actors, vehicle maneuvers, and other domain constraints. For example, the ODD refers to the specific conditions under which the autonomous vehicle is intended to perform "adequately" in autonomy on the public roads. The performance validation system 160 estimates a performance metric of interest (e.g., the likelihood of an event occurring per 100,000 miles) in association with an autonomous vehicle in the real world. For example, the event may be the autonomous vehicle rear-ending another vehicle. An existing approach is to test the autonomous vehicle including perception, planning, and other tasks performed by the autonomous vehicle in the real world. For example, autonomous vehicle tasks may include control signals indicating a route change action, a planning action, and/or other autonomous vehicle actions which are generated in response to data collected from one or more autonomous vehicle sensors. However, waiting for the performance data to be gathered for various autonomous vehicle tasks from the operation of autonomous vehicles in the real world takes extended periods of time (e.g., weeks, months, years, etc.). Beyond the issue that an occurrence of a particular event may be rare, another particular issue with testing the autonomous vehicle in the real world is that the amount of data that needs to be collected becomes prohibitively expensive.

Another existing approach is to make use of a set of simulation scenarios to validate and verify the performance of the autonomous vehicle in simulations. A simulation scenario may describe a three-dimensional scene (e.g., a virtual scene) that simulates the behavior, properties, and sensor configuration of the autonomous vehicle in a specific encounter with the environment including other vehicles (autonomous and/or non-autonomous) at rest or in motion, pedestrians, time of day, weather conditions, terrain, and road surface markings, among other things. For example, the simulation scenarios may include perception scenarios, perception simulation scenarios, motion planning simulations scenarios, vehicle detection and tracking (VDT) scenarios, etc. However, a measurement of the performance metrics obtained for the autonomous vehicle from the set of simulation scenarios can be biased and fail to translate to an actual measurement of the performance metrics for the autonomous vehicle in the real world because of the difference in the distribution of events in the set of simulation scenarios and an ODD-relevant scenario. The ODD-relevant scenario may define a distribution of events expected to occur in real-world driving. The present disclosure is particularly advantageous because it provides a system and method for estimating, with confidence intervals, the value of performance metrics for the autonomous vehicle in the real world based on the set of simulation scenarios by reweighting each simulation scenario in the set with respect to their exposure in the ODD-relevant scenario.

Autonomous Vehicle

Referring to the drawings, wherein like numbers denote like parts throughout the several views, FIG. 1 illustrates an example hardware and software environment for an autonomous vehicle within which various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling by land, by sea, by air, underground, undersea, and/or in space, and it will be appreciated that the aforementioned components 102-116 may vary widely based upon the type of vehicle within which these components are utilized.

For simplicity, the implementations discussed hereinafter will focus on a wheeled land vehicle such as a car, van, truck, bus, etc. In such implementations, the prime mover 104 may include one or more electric motors and/or an internal combustion engine (among others). The energy source 106 may include, for example, a fuel system (e.g., providing gasoline, diesel, hydrogen, etc.), a battery system, solar panels or other renewable energy source, and/or a fuel cell system. The drivetrain 108 includes wheels and/or tires along with a transmission and/or any other mechanical drive components suitable for converting the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some implementations, multiple electric motors (e.g., dedicated to individual wheels or axles) may be used as a prime mover. In the case of a hydrogen fuel cell implementation, the prime mover 104 may include one or more electric motors and the energy source 106 may include a fuel cell system powered by hydrogen fuel.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to airplanes, space vehicles, helicopters, drones, military vehicles, all-terrain or tracked vehicles, ships, submarines, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, full or semi-autonomous control over the vehicle 100 is implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle 100. For example, sensors 130 can include RADAR sensor 134, LIDAR (Light Detection and Ranging) sensor 136, a 3D positioning sensor 138, e.g., a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can optionally include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle 100 in three directions. One or more encoders 144, such as wheel encoders may be used to monitor the rotation of one or more wheels of vehicle 100.

The outputs of sensors 130 may be provided to a set of control subsystems 150, including, a localization subsystem 152, a perception subsystem 154, a planning subsystem 156, and a control subsystem 158. The localization subsystem 152 is principally responsible for precisely determining the location and orientation (also sometimes referred to as "pose") of the vehicle 100 within its surrounding environment, and generally within some frame of reference. The perception subsystem 154 is principally responsible for detecting, tracking, and/or identifying objects within the environment surrounding vehicle 100. A machine learning model in accordance with some implementations can be utilized in tracking objects. The planning subsystem 156 is principally responsible for planning a trajectory or a path of motion for vehicle 100 over some timeframe given a desired destination as well as the static and moving objects within the environment. A machine learning model in accordance with some implementations can be utilized in planning a vehicle trajectory. The control subsystem 158 is principally responsible for generating suitable control signals for controlling the various controls in the vehicle control system 120 in order to implement the planned trajectory of the vehicle 100. Similarly, a machine learning model can be utilized to generate one or more signals to control the autonomous vehicle 100 to implement the planned trajectory.

It will be appreciated that the collection of components illustrated in FIG. 1 for the vehicle control system 120 is merely one example. Individual sensors may be omitted in some implementations. Additionally, or alternatively, in some implementations, multiple sensors of the same types illustrated in FIG. 1 may be used for redundancy and/or to cover different regions around a vehicle. Moreover, there may be additional sensors beyond those described above to provide actual sensor data related to the operation and environment of the wheeled land vehicle. Likewise, different types and/or combinations of control subsystems may be used in other implementations. Further, while subsystems 152-160 are illustrated as being separate from processor 122 and memory 124, it will be appreciated that in some implementations, some or all of the functionality of a subsystem 152-160 may be implemented with program code instructions 126 resident in one or more memories 124 and executed by one or more processors 122, and that these subsystems 152-160 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors 122 illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 176 to permit the communication of information with other computers and electronic devices, including, for example, a central service, such as a cloud service, from which the vehicle 100 receives information including trained machine learning models and other data for use in autonomous control thereof. The one or more networks 176, for example, may be a communication network that includes a wide area network ("WAN") such as the Internet, one or more local area networks ("LANs") such as Wi-Fi LANs, mesh networks, etc., and one or more bus subsystems. The one or more networks 176 may optionally utilize one or more standard communication technologies, protocols, and/or inter-process communication techniques. In some implementations, data collected by the one or more sensors 130 can be uploaded to a computing system 172 via the network 176 for additional processing.

In the illustrated implementation, the vehicle 100 may communicate via the network 176 with a computing device 172 for the purposes of implementing various functions described below for validating a performance of the autonomous vehicle 100 in the real world. In some implementations, computing device 172 is a cloud-based computing device. As described below in more detail with reference to FIG. 2, the computing device 172 includes a performance validation system 160 and a machine learning engine 166. For example, in some implementations, the performance validation system 160 operates on the computing system 172 to execute a simulation of a simulation scenario, weight the simulation scenario with respect to its exposure in the ODD using the machine learning engine 166, and estimate a performance metric of interest for the autonomous vehicle in the real world using the weighted simulation scenario.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer (e.g., computing system 172) coupled to vehicle 100 via network 176, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program codes described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The example environment illustrated in FIG. 1 is not intended to limit implementations disclosed herein. Indeed, other alternative hardware and/or software environments may be used without departing from the scope of implementations disclosed herein.

Performance Validation System

Figure 2:
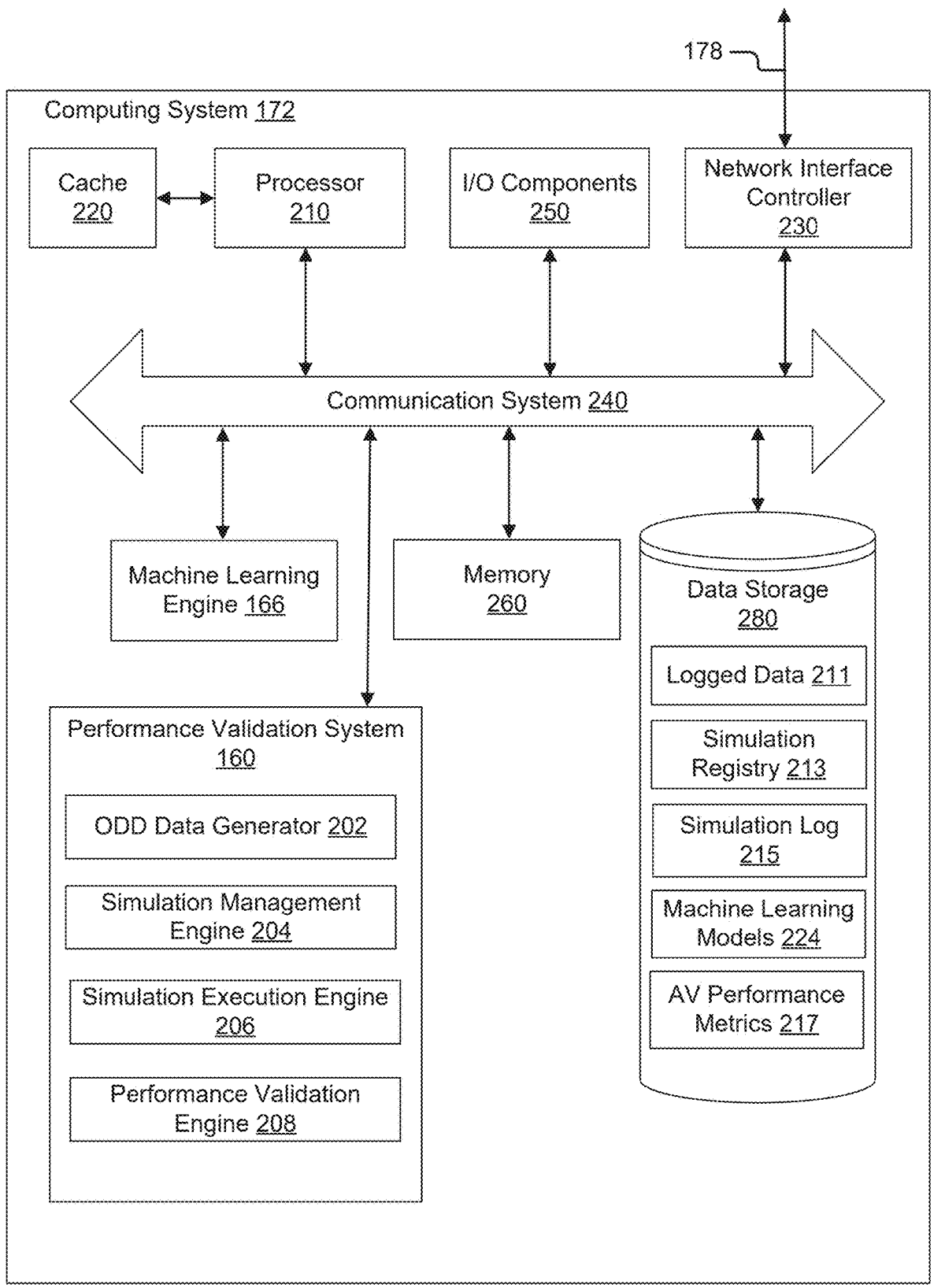
FIG. 2 is a block diagram illustrating an example computing system for estimating expected values of performance metrics for the autonomous vehicle in the real world according to some implementations.

FIG. 2 is a block diagram illustrating an example of a computing system 172 for estimating expected values of performance metrics for the autonomous vehicle in the real world according to some implementations.

Referring to FIG. 2, the illustrated example computing system 172 includes one or more processors 210 in communication, via a communication system 240 (e.g., bus), with memory 260, at least one network interface controller 230 with network interface port for connection to a network (e.g., network 176 via signal line 178), a data storage 280, and other components, e.g., an input/output ("I/O") components interface 250 connecting to a display (not illustrated) and an input device (not illustrated), a performance validation system 160, and a machine learning engine 166. Generally, the processor(s) 210 will execute instructions (or computer programs) received from memory 260. The processor(s) 210 illustrated incorporate, or are directly connected to, cache memory 220. In some instances, instructions are read from memory 260 into the cache memory 220 and executed by the processor(s) 210 from the cache memory 220.

In more detail, the processor(s) 210 may be any logic circuitry that processes instructions, e.g., instructions fetched from the memory 260 or cache 220. In some implementations, the processor(s) 210 are microprocessor units or special purpose processors. The computing device 172 may be based on any processor, or set of processors, capable of operating as described herein. The processor(s) 210 may be a single core or multi-core processor(s). The processor(s) 210 may be multiple distinct processors.

The memory 260 may be any device suitable for storing computer readable data. The memory 260 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 172 may have any number of memory devices as the memory 260. While the performance validation system 160 and the machine learning engine 166 are illustrated as being separate from processor 210 and memory 260, it will be appreciated that in some implementations, some or all of the functionality of the components 160 and 166 may be implemented with program code instructions resident in the memory 260 and executed by the processor 210.

The cache memory 220 is generally a form of computer memory placed in close proximity to the processor(s) 210 for fast read times. In some implementations, the cache memory 220 is part of, or on the same chip as, the processor(s) 210. In some implementations, there are multiple levels of cache 220, e.g., L2 and L3 cache layers.

The network interface controller 230 manages data exchanges via the network interface (sometimes referred to as network interface ports). The network interface controller 230 handles the physical and data link layers of the OSI model for network communication. In some implementations, some of the network interface controller's tasks are handled by one or more of the processors 210. In some implementations, the network interface controller 230 is part of a processor 210. In some implementations, a computing system 172 has multiple network interfaces controlled by a single controller 230. In some implementations, a computing system 172 has multiple network interface controllers 230. In some implementations, each network interface is a connection point for a physical network link (e.g., a cat-5 Ethernet link). In some implementations, the network interface controller 230 supports wireless network connections and an interface port is a wireless (e.g., radio) receiver/transmitter (e.g., for any of the IEEE 802.11 protocols, near field communication "NFC", Bluetooth, ANT, WiMAX, 5G, or any other wireless protocol). In some implementations, the network interface controller 230 implements one or more network protocols such as Ethernet. Generally, a computing device 172 exchanges data with other computing devices via physical or wireless links (represented by signal line 178) through a network interface. The network interface may link directly to another device or to another device via an intermediary device, e.g., a network device such as a hub, a bridge, a switch, or a router, connecting the computing device 172 to a data network such as the Internet.

The data storage 280 may be a non-transitory storage device that stores data for providing the functionality described herein. The data storage 280 may store, among other data, logged data snippets 211, a simulation registry 213, a simulation log 215, autonomous vehicle (AV) performance metrics 217, and a machine learning model or representation 224, as will be defined below.

The computing system 172 may include, or provide interfaces for, one or more input or output ("I/O") devices 250. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers. Other components may include an I/O interface, external serial device ports, and any additional co-processors. For example, a computing system 172 may include an interface (e.g., a universal serial bus (USB) interface) for connecting input devices, output devices, or additional memory devices (e.g., portable flash drive or external media drive). In some implementations, a computing device 172 includes an additional device such as a co-processor, e.g., a math co-processor can assist the processor 210 with high precision or complex calculations.

In implementations consistent with the disclosure, the performance validation system 160 is utilized to estimate an expected value of one or more performance metrics for the autonomous vehicle 100 in the real world. More specifically, the present disclosure is directed to estimating, with confidence intervals, the performance metrics for the autonomous vehicle 100 in the real world based on weighting a set of simulation scenarios appropriately in accordance with their distribution expected in an ODD-relevant scenario. For example, the ODD-relevant scenario may define a distribution of one or more events expected in real world driving. In some implementations, the performance validation system 160 includes an ODD data generator 202, a simulation management engine 204, a simulation execution engine 206, and a performance validation engine 208. The ODD data generator 202, the simulation management engine 204, the simulation execution engine 206, and the performance validation engine 208 of the performance validation system 160 and separately the machine learning engine 166 are example components in which the techniques described herein may be implemented and/or with which systems, components, and techniques described herein may interface. While described in the context of the computing system 172, it should be understood that the operations performed by the one or more components 202, 204, 206, 208, and 166 of FIG. 2 may be distributed across multiple computing systems. In some implementations, one or more aspects of components 202, 204, 206, 208, and 166 may be combined into a single system and/or one or more aspects may be implemented by the computing system 172. For example, in some implementations, aspects of the ODD data generator 202 may be combined with aspects of the simulation management engine 204. In another example, aspects of performance validation engine 208 may be combined with aspects of the simulation execution engine 206. Engines in accordance with many implementations may each be implemented in one or more computing devices that communicate, for example, through the communication network 176. For purposes of this disclosure, the terms "ODD of interest" "ODD route" and "ODD-relevant scenario" are used interchangeably to mean the same thing, namely, ground truth driving data collected in association with the autonomous vehicle 100 under ODD-specific (e.g., real-world driving) conditions on public roads.

The ODD data generator 202 may receive and store vehicle logged data 211 collected during one or more driving sessions of an autonomous, partially autonomous, or non-autonomous vehicle in the real world. For example, the one or more sensors 130 of the autonomous vehicle may collect a set of vehicle logged data 211 along one or more ODD routes in the real world and upload the collected data to the computing system 172 via the network 176. The set of vehicle logged data 211 may represent typical situations or events that the autonomous vehicle is expected to encounter in the one or more ODD routes in the real world. In some implementations, each instance of vehicle logged data may be associated with a time stamp. The vehicle logged data may include time series log data, such as localization data, tracking data, and optionally include other vehicle sensor data and environmental data. For example, during a driving session of an autonomous vehicle, the vehicle control subsystem 150 may collect data at different points in time along with a record of when the data was acquired. As an example, each instance of time series log data may include a current location, orientation, and speed of the autonomous vehicle based on the localization data. The tracking data may include tracking of objects external to the autonomous vehicle describing their position(s), extent(s), orientation(s) categories, speed(s), and other tracking data or tracking predictions. Information on static objects (e.g., highway signs, lane markings, road surfaces, etc.) may also be logged. In some implementations, other forms of environmental data may also be logged (e.g., weather conditions, lighting conditions, visibility, etc.). The ODD data generator 202 may process and convert the time stamped vehicle logged data 211 collected along an ODD route in the real world into a set of ODD route snippets or route segments. Each ODD route snippet in the set may include an event encountered by the autonomous vehicle 100. Depending on the event, the ODD route snippet may include vehicle logged data before and/or after the event occurrence as well. For example, an ODD route snippet having a duration of 30 seconds may include 10 seconds of vehicle logged data before and after the event occurrence. The ODD data generator 202 may store the set of ODD route snippets (e.g., set of logged data snippets of real world driving) under the logged data 211 in the data storage 211.

A core framework of the developmental ODD in autonomous vehicle space may include three groupings: operational environment (OE), vehicle maneuvers (VM), and actors (A) or object and event detection and response (OEDR). For example, the OE grouping refers to characterizing the operational environment of the autonomous vehicle 100 that includes factors, such as roadway types, geographic characteristics, speed ranges, weather and environmental conditions, traffic rules, location of operation, etc. The VM grouping refers to the type of maneuvers the autonomous vehicle 100 itself initiates, typically having to do with navigation, such as entering and exiting a limited access roadway, initiating turns, changing lanes, stopping, parking, powering on and off, etc. The OEDR grouping or Actor (A) grouping refers to the proper handling of external situations that the autonomous vehicle 100 encounters, including actors and objects, perception, planning, and implementation of the autonomous vehicle actions. The three groupings described above result in a three-dimensional space, where the intersecting space of all possible factors across all three axes may be addressed as in-scope or out-of-scope.

In some implementations, the ODD data generator 202 may receive one or more user annotations (e.g., labels) for tagging each ODD route snippet in the set of logged data snippets based on a presence of OE, VM, and OEDR elements. For example, the ODD data generator 202 may provide a user interface for a user to tag all relevant OE, VM, and OEDR elements in an ODD route snippet. Each ODD route snippet may include tags for speed limit, road type, lane description, direction and at least one vehicle maneuver. The ODD data generator 202 stores the tags provided as annotations for each ODD route snippet in the logged data 211. The tags make it easier to query the set of ODD route snippets. For example, the set of ODD route snippets may also be categorized based on the tags. In some implementations, the ODD data generator 202 curates the training data set of ODD route snippets and a categorization of OE, VM, and OEDR tags provided for each ODD route snippet to train one or more machine learning models.

Example OE elements that may be tagged in an ODD route snippet include but are not limited to time of day (e.g., morning, midday, evening, night, etc.), speed limit (e.g., 25 mph, 30 mph, 40 mph, etc.), road type or road surface (e.g., surface street, feeder or frontage road, highway, on ramp, off ramp, parking lot, etc.), straight traveling lanes (e.g., one lane straight, two lane straight, three lane straight, four lane straight, etc.), lane direction (e.g., one-way, two-way undivided, two-way divided, etc.), intersection (e.g., 4-way traffic light intersection, 3-way traffic light intersection, 2-way traffic light intersection, 1-way traffic light intersection, 4-way or all-way stop sign intersection, 2-way stop sign intersection, 1-way stop sign, 2-way uncontrolled intersection, 3-way uncontrolled intersection, 4-way uncontrolled intersection, etc.), type of traffic light (e.g., traffic light with protected left arrow, traffic light with protected right arrow, etc.), road elements (e.g., shoulder present on left, shoulder present on right, shoulder present on both sides, parallel parking lane present next to AV lane, bicycle lane, crosswalk, railroad crossing, fire lane, two lanes merging into one, etc.), etc.

Example VM elements that may be tagged in an ODD route snippet include but are not limited to turns (e.g., turn unprotected left, turn right when the autonomous vehicle does not have a right of way, turn right on red at traffic light, turn protected right, turn protected left, turn right at a stop sign or when the autonomous vehicle has the right of way, turn left at a stop sign or when the autonomous vehicle has the right of way, U-turn, etc.), lane change (e.g., lane change to right, lane change to left), lane position (e.g., lane position occupied (starting from right most lane=1), and additional autonomous vehicle behaviors (e.g., merge, hold appropriate velocity for the speed limit of the road and/or modulate speed because of lead actor(s), stop, nudge, travel straight following a green traffic light, after stopping at a stop sign, or through uncontrolled intersection, etc.).

Example OEDR elements that may be tagged in an ODD route snippet include but are not limited to presence or absence of actors/objects (e.g., pedestrians, motorcycle, cyclist, vehicles, foreign objects, construction zones, toll booths, police traffic stops, etc.) in or near AV path, occluded or un-occluded actors/objects in or near AV path, compliant or non-compliant actors/objects in or near AV path, type of actors/objects in or near AV path, motion (e.g., speed, velocity, acceleration, etc.) of actors/objects in or near AV path, etc.

The simulation management engine 204 may access, process, and manage a base set of simulation scenarios that is sufficiently diverse to model a set of real-world situations with which the behavior of the autonomous vehicle 100 can be tested. In some implementations, the simulation management engine 204 may access a base simulation scenario and convert the base simulation scenario into a plurality of simulation scenarios. For example, the simulation management engine 204 may use a parameter sweep to adjust a value of a parameter in a base simulation scenario through a defined range and generate configurations for a plurality of varying simulation scenarios. In another example, the simulation management engine 204 may use Monte Carlo sampling method for randomly sampling a value of a parameter in a base simulation from a probability distribution and generate configurations for a variety of simulation scenarios. As an example, changing the parameters in the base simulation scenario may include changing one or more configuration values of a vehicle platform parameter, a mapping parameter, a start gate, a start speed, actor (e.g., bicycle, pedestrian, etc.) placement, environmental parameter, or other autonomy parameters. In some implementations, the simulation management engine 204 may use the vehicle logged data 211 (e.g., generated by the ODD data generator 202) as a source of data that is based on ground truth about real world driving situations to adjust the parameter values in the base simulation scenario for generating the plurality of varying simulation scenarios. For example, in some implementations, the simulation management engine 204 uses logged vehicle data as an aid to generate a description including a behavior, vehicle configuration (e.g., autonomous vehicle location, platform, speed, or orientation), and sensor configuration of autonomous vehicle (e.g., ego vehicle) and the environment including actors (e.g., other vehicles, traffic, pedestrians, and static objects) in a simulation scenario. However, more generally, in some implementations, other information available from the logged vehicle data may be used as an aid in generating a simulation scenario. The vehicle logged data 211 may be generally used, in some implementations, as a resource to provide a source of real sensor data for a simulation task that requires a source of real sensor data.

The simulation management engine 204 may register a simulation scenario by generating a simulation identifier, assigning the simulation identifier to the simulation scenario, and storing the simulation scenario in the simulation registry 213 indexed by the simulation identifier in the data storage 280. For example, the simulation identifier may be a globally unique identifier (GUID). The simulation registry 213 may be a database storing currently and previously available simulation scenarios indexed by their corresponding simulation identifiers. In some implementations, the simulation management engine 204 may process a simulation scenario and derive one or more tags to associate with the simulation scenario in the simulation registry 214. For example, the tag may be based on one or more of a geography (e.g., San Francisco, New York, etc.), actors (e.g., other vehicles, bicycles, pedestrians, mobility scooters, motorized scooters, etc.), behaviors (e.g., lane change, merge, steering, etc.), location (e.g., four-way stop, intersection, ramp, etc.), status (e.g., deprecated, quarantined, etc.), vehicle make and model, sensor configurations, etc. The simulation management engine 204 may also receive one or more user annotations for tagging each simulation scenario in the simulation registry 213 based on a presence of OE, VM, and OEDR elements. For example, the simulation management engine 204 provides a user interface for a user to tag all relevant OE, VM, and OEDR elements in a simulation scenario. The annotated tags make it easier to query the simulation registry 213 and select a simulation scenario. The simulation scenarios may also be categorized in the simulation registry 213 by the annotated tags. In some implementations, the simulation management engine 204 provides a user interface to query the simulation registry 213 for selecting one or more simulation scenarios to execute in a simulation. For example, the query may include one or more phrases, such as "pedestrians near the AV path," "speed limit=55 mph," "4-way traffic light intersection," etc. The simulation management engine 204 matches the query with the annotated tags associated with the simulation scenarios and retrieves the matching simulation scenarios from the simulation registry 213.

The simulation execution engine 206 may execute a simulation for the set of control subsystems 150 of the autonomous vehicle 100 based on one or more simulation scenarios in the simulation registry 213. For example, the simulation scenarios may correspond to perception simulation scenarios, motion planning simulation scenarios, vehicle detection and tracking scenario, etc. In some implementations, the simulation management engine 204 sends a simulation identifier to the simulation execution engine 206. The simulation execution engine 206 uses the simulation identifier to fetch a configuration of a matching simulation scenario from the simulation registry 213 and executes a simulation based on the fetched simulation scenario configuration. The simulation execution engine 206 may create a run identifier (run ID) to associate with an execution (run) of the simulation. In some implementations, the simulation execution engine 206 may create a batch of a plurality of simulation scenario variations and execute the batch in a single execution. In such implementations, the simulation execution engine 206 may create a batch identifier (batch ID) to associate with the batch execution. The simulation execution engine 206 may generate a simulation result and/or a simulation log during the execution of the simulation and store it in the simulation log 215. In some implementations, the simulation result and/or a simulation log may be one or more formatted messages including or encoded with state information of the autonomous vehicle 100 and other actors observed in the simulation. For example, the state information may include detection of events associated with the autonomous vehicle 100, such as false positives, hard braking, slow downs, and other potential critical events observed in the simulation run. The simulation log 215 may be a database storing a historical log of simulation runs indexed by corresponding run ID and/or batch ID. In some implementation, the simulation execution engine 206 generates one or more formatted messages reflecting events observed in the simulation scenario in real time during execution of the simulation for streaming to the performance validation engine 208.

The performance validation engine 208 may monitor execution of the simulation based on a plurality of simulation scenarios by the simulation execution engine 206. The simulations often have many different modules and during execution each of the modules generates and sends several messages with state information about the simulation execution. The execution of the simulation by the simulation execution engine 206 may be configured to forward the messages to the performance validation engine 208 for processing in real time or with some amount of predetermined latency. In some implementations, the performance validation engine 208 may process simulation result and/or a simulation log 215 after the simulation(s) have executed. The performance validation engine 206 processes the messages and automatically detects occurrence of one or more events during the execution of the simulation. The performance validation engine 206 determines values of one or more performance metrics for the autonomous vehicle 100 from the execution of the simulations. The performance metric of interest may be a statistic to determine for the autonomous vehicle 100 along multiple AV performance dimensions, such as safety, comfort, etc. Example performance metrics of interest include but are not limited to a rate of collision, severity of collision, number of hard brakes, number of swerves, statistics tracking the AV being overly close to other actors (e.g., tailgating), etc. The values of these metrics may be measured from the plurality of simulation scenarios used to test the behavior of the autonomous vehicle 100. However, the plurality of simulation scenarios may not be representative of the real-world distribution of events covered within them. For example, the plurality of simulation scenarios may tend to over represent hard cases. An evaluation of AV performance in the plurality of simulation scenarios may produce an estimate that is too pessimistic (assuming the simulations are biased toward being atypical) or too optimistic (assuming the simulations are biased toward being uneventful). As such, the performance metric values measured directly from the simulations cannot be accurately reported as the metrics expected to occur in the real world.

Consider that an example performance metric for the autonomous vehicle 100 is its likelihood of hitting a curb while driving in the real world. An event of hitting the curb while driving may be an unlikely and risky event (e.g., with a likelihood of happening once every 100K miles of driving in the real world). As such, it is not practical to estimate this likelihood from real-world driving data of the autonomous vehicle 100. A random set of simulation scenarios may be run to estimate this likelihood from measuring the AV's performance in the simulations. Assuming, for example, that a set of 200 simulations are run for 100K miles, the likelihood of hitting the curb while driving may not be observable in the 200 simulations at the same rate of every 100K of driving in the real world. As such, the random set of simulation scenarios is also unlikely to provide a good estimate of the performance metric in the real world. Also, during optimization, the simulations that are run by the simulation execution engine 206 may oversample from the set of simulation scenarios that lead to the risky event and negatively affect the behavior of the autonomous vehicle 100 in the set of under-sampled simulation scenarios that are easier in comparison. Even with a good mix of easy and hard simulation scenarios (one that oversamples in the hard cases but does not neglect the easy cases), the estimate of the performance metric for the autonomous vehicle 100 may be biased. The performance validation engine 206 remedies the above-stated potential obstacles by appropriately reweighting each simulation scenario in the set with respect to their occurrence in the real world. The performance validation engine 206 estimates, with confidence intervals, the value of a performance metric of interest for the autonomous vehicle 100 in the real world given the values of the performance metric as determined from the representative set of simulation scenarios. In some implementations, the performance validation engine 206 uses a maximum entropy approach to determine how well the distribution of events covered by the representative set of simulations matches the distribution of events expected in the real-world driving.

Figure 3:
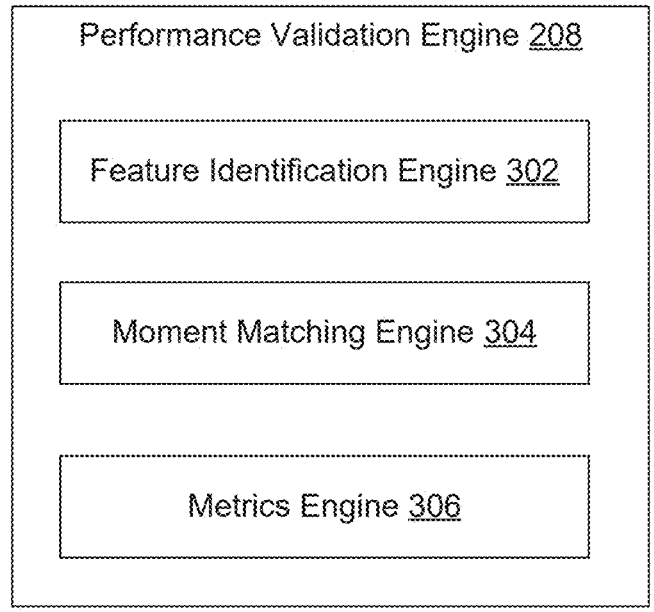
FIG. 3 is a block diagram illustrating an example implementation of a performance validation engine referenced in FIG. 2.

Referring to FIG. 3, an example implementation of the performance validation engine 208 is illustrated in greater detail. The performance validation engine 208 includes a feature identification engine 302, a moment matching engine 304, and a metrics engine 306.

In some implementations, the feature identification engine 302 determines a set of features $F=\{f_0, f_1, \ldots, f_m\}$ that correspond to evaluating a performance metric of interest for the autonomous vehicle 100. The set of features may also correspond to what is important for simulation coverage evaluation. Example features include but are not limited to speed limit, presence of a stop sign intersection along an AV's route, presence of an actor lane-changing into the AV's lane, presence of jaywalkers, presence of an occlusion, presence of unprotected left turn at intersection, minimum pedestrian distance to AV's path, an amount of time the AV was tailgated by another vehicle, etc. The feature identification engine 302 determines the set of features for each simulation scenario in the set of simulation scenarios and/or each log in the set of logged data associated with an ODD for moment matching as will be described in more detail below. The set of features may describe a scene within the simulation scenario. For example, a feature may be defined as a function from the scenario to a real number. The set of features may be correlated with or predictive of a performance metric of interest for the autonomous vehicle 100. In some implementations, the feature identification engine 302 determines a set of features in a plurality of preexisting simulations based on simulation log 215 for simulation coverage evaluation. For example, the set of features important for determining a likelihood of the autonomous vehicle 100 rear ending a lead actor (e.g., another vehicle) may include speed limit, distance between the autonomous vehicle and the lead actor, presence of occlusion, etc. In some implementations, the feature identification engine 302 receives the identification of a set of features that correspond to evaluating a performance metric of the autonomous vehicle 100 from a safety team of professionals overseeing the development of the autonomous vehicle 100. For example, the safety team may identify a feature set that is concise and predictive of the desired performance metric. In another example, the safety team may identify a feature set that is preserving of the statistics empirically observed in ODD data. In some implementations, the feature identification engine 302 identifies a set of features that correspond to evaluating a performance metric of the autonomous vehicle 100 from external data sources. For example, the feature identification engine 302 may access published reports and documents from National Highway Traffic and Safety Administration (NHTSA) on autonomous vehicle technology to identify the set of features that are important for the performance metric or statistic to measure.

The feature identification engine 302 determines an expected value of each feature in the real world using the set of vehicle logged data 211 collected in one or more ODD routes. The expected value or average or moment or integral of a feature $f_i$ in the real world is represented as shown below:

$$m_i = E_{s \sim Real}[f_i(s)]$$

In some implementations, the feature identification engine 302 may randomly sample the set of logged data snippets of real world driving and estimate the observed expected value of each feature observed in the real world. For example, the observed expected value (or moment) of each feature in the set of features may describe the distribution of real-world driving data in the ODD. The feature identification engine 302 may instruct the simulation execution engine 206 to configure a simulation scenario for the ODD route based on the set of logged data snippets and execute a simulation accordingly to determine the observed expected value of each feature within a distribution of the ODD. For example, the perception and/or planning subsystems in the autonomous vehicle 100 may propose a value for the features in the ODD during the execution of the simulation. The feature identification engine 302 may determine a value and a number of times (feature count) a feature $f_i$ occurs in the real world and estimate an observed expected feature value and an observed expected feature count or an average rate of the feature $f_i$ to obtain its 'moment' $m_i$ for moment matching. For example, the feature identification engine 302 may determine a rate of encountering jaywalkers per unit time in the real world. In another example, the feature identification engine 302 may determine a number of pedestrians per mile in the real world. In some implementations, the feature identification engine 302 estimates the observed expected value of features in the real world based on statistical safety analysis of data collected from external data sources. For example, some features, such as presence of traffic red-light runners may be rare in the real world and can be estimated using external data sources, such as published reports from NHSTA, video footages from dashboard camera database, etc. The feature identification engine 302 is adapted to receive input from users, such as the safety team of professionals to support, define, and refine the rate estimation of such features obtained from the external data sources. The expected value of a feature may be modified by user input if specific deviations from nominal driving is desired. For example, the expected value of feature, such as "presence of stop sign" may be manually set to 1.0 for moment matching with simulation scenarios exclusively having stop signs in them. In some implementations, the feature identification engine 302 determines arbitrary features in a more automated way using an automatic feature extraction module. For example, the feature identification engine 302 determines the ground-truth ODD statistics in a more automated way by processing the set of vehicle logged data 211 collected along one or more ODD routes, computing a vector of features per log, and outputting the expected value of each of these features across all of the logs.

The moment matching engine 304 determines a weight for each simulation scenario in the plurality of simulation scenarios in accordance with their exposure in the ODD-relevant scenario. For example, the moment matching engine 304 determines a weight for a simulation scenario such that the weight is directly proportional to the probability or frequency of the simulation scenario occurring in the ODD-relevant scenario. The moment matching engine 304 identifies the weight of a simulation scenario as a function of one or more features in the simulation scenario. The moment matching engine 304 receives the expected value determined for the set of features in the real world from the feature identification engine 302. The moment matching engine 304 implements a process termed as moment matching where it compares the expected feature counts between a first distribution of an ODD of interest and a second distribution of the plurality of simulation scenarios. The moment matching engine 304 reweights each simulation scenario in the plurality of simulation scenarios such that the expectation or average (rate) of the features between the plurality of simulation scenarios and the ODD of interest is matched within a threshold range. For example, assume that a rate of encountering jaywalkers per unit time is measured in the ODD of interest by the feature identification engine 302. Once the moment matching engine 304 reweights each simulation scenario in the plurality of simulations scenarios, the rate of encountering jaywalkers per unit time in both the plurality of simulation scenarios and the ODD of interest is made to be the same or approximately the same within a threshold range.

There are multiple ways to match the moments between the first distribution of the ODD of interest and the second distribution of the plurality of simulation scenarios. Given a set of features $F=\{f_0, f_1, \ldots, f_m\}$ and a set of simulation scenarios $S=\{s_0, s_1, \ldots, s_n\}$, the moment matching engine 304 automatically determines a weight $w(s_j)$ for each simulation scenario $s_j$ such that the following moment matching constraints are satisfied.

$$\forall f_i, E_{s \sim Model}[f_i(s)] \approx E_{s \sim Real}[f_i(s)], \text{ where } E_{s \sim Model}[f_i(s)] = \Sigma_j w(s_j) f_i(s_j)$$

where $E_{s \sim Model}[f_i(s)]$ is the expected value or average or moment of a feature $f_i$ under the model. Given these weights $w(s)$, the metrics engine 306 estimates the expected value of the performance metric of interest $c(s)$ for the autonomous vehicle 100 in real world as:

$$E_{s \sim real}[c(s)] \approx E_{s \sim model}[w(s)c(s)]$$

The computation of weights for the set of simulation scenarios is a convex optimization problem. In some implementations, the moment matching engine 304 solves the convex optimization problem based on maximum entropy (MaxEnt) modeling. For example, the moment matching engine 304 maximizes the entropy of the Gibbs distribution over strategies implied by the weights using the MaxEnt algorithm (machine learning method) such that the weights are as close to the uniform distribution as possible, subject to the moment matching constraints that the resulting model distribution matches the real-world statistics. In other words, the moment matching engine 304 finds a function based on the MaxEnt modeling that spreads out the weights as much as possible among the set of simulation scenarios while also trying to match the mathematical expectation of the feature counts between the set of simulation scenarios and the ODD of interest. This ensures that the moment matching engine 304 does not end up placing too much faith on any one simulation scenario in the set. If the weight for each simulation scenario $s_j$ is expressed as $$w(s_j) = \frac{e^{\Sigma_i f_i(s_j)\theta_i}}{z},$$

then the gradient of the objective with respect to $\theta_i$ is given by $E_{s-Real}[f_i(s)]-E_{s-Model}[f_i(s)]$. The denominator Z is a normalizing constant called the partition function in the Gibbs distribution. The moment matching engine 304 may generate and store computed weights associated with the set of simulation scenarios in the simulation log 215.

To put it differently, the moment matching engine 304 estimates the "true" frequency of a simulation scenario (SIM) under an ODD-relevant scenario. An estimation of the performance metrics of the autonomous vehicle 100 in the ODD-relevant scenario may be determined by weighting the performance metrics of the autonomous vehicle 100 in the simulation by the simulation scenario's estimated "true" frequency in the ODD-relevant scenario. In some implementations, the moment matching engine 304 determines frequencies for each simulation scenario based on MaxEnt modeling.

Let (OE, VM, A) represent a group of attributes associated with a simulation scenario or an ODD route. For a given ODD route (ODD) and a simulation scenario (SIM), the moment matching engine 304 estimates a conditional probability P of SIM given ODD:

$$P(SIM|ODD) = \sum_{OE} P(VM, A|OE)P(OE|ODD)$$

where a conditional probability of OE given ODD, P(OE|ODD) is empirically determined from ODD route statistics and a conditional probability of VM, A given OE, P(VM, A|OE) is estimated using a machine learning method, such as the MaxEnt method. For example, the MaxEnt method receives a combination of features from the simulation scenario (SIM) and generates an output of a probability that is a function of the combination of features or attributes represented by (OE, VM, A) triplets. That is, the goal of the machine learning-based frequency estimation approach is to estimate P (VM, A|OE) for all (OE, VM, A) combinations, given appropriate features of a simulation scenario and training data. It is about finding the maximum-entropy distribution over the set of simulation scenarios subject to the constraint that the expected values of the features under the resulting distribution match the expected values of the features observed on the ODD route.

Figure 4A:
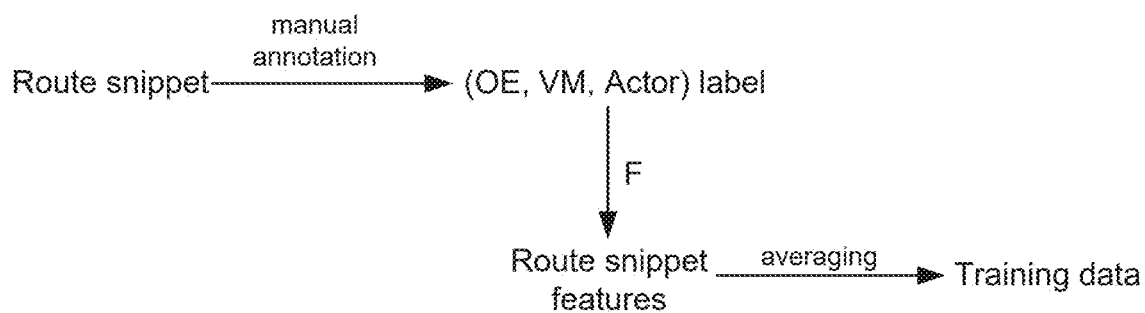
FIG. 4A is a schematic diagram for generating training data from ODD route snippets according to some implementations.
Figure 4B:
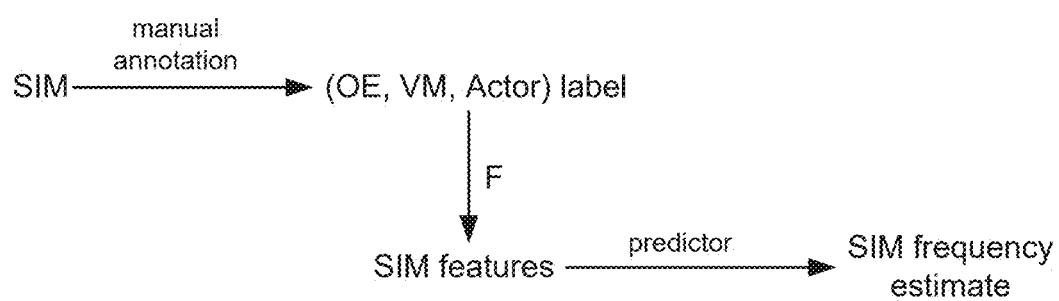
FIG. 4B is a schematic diagram for estimating a frequency of a simulation scenario in the ODD according to some implementations.

FIG. 4A is a schematic diagram for generating training data from ODD route snippets in accordance with some implementations. The moment matching engine 304 receives the training set of ODD route snippets and the categorization of OE, VM, and Actor labels provided as annotations for each ODD route snippet from the ODD data generator 202. In one example, the annotations of OE, VM, and Actor labels may be automatic annotations based on determinations made by the perception and/or planning subsystems in the autonomous vehicle 100. In FIG. 4A, F is a feature function that translates the OE, VM, and Actor labels associated with an ODD route snippet into a set of features for the ODD route snippet. The moment matching engine 204 generates the training data by averaging over the set of features from the ODD route snippet. A feature may be considered as an analogous grouping of (OE, VM, A) attributes. For example, one feature might group together a (theoretical) "residential" OE with "pedestrian" and "cyclist" actors, while another feature might group together "highway" and "business district" OE with "car" and "motorcycle" actors. Each group of attributes may be a prototypical situation encountered in the ODD. FIG. 4B illustrates a schematic diagram for estimating a frequency of a simulation scenario in the ODD in accordance with some implementations. In FIG. 4B, the feature function F translates the OE, VM, and Actor labels associated with a simulation scenario into a set of features for the simulation scenario. The moment matching engine 204 cooperates with the machine learning engine 166 to train a machine learning model (e.g., MaxEnt method) using the training data such that it results in a model distribution matching the ODD distribution. The machine learning model takes as the input the set of features (predictor) of the simulation scenario and provides an estimate of a frequency of the simulation scenario in the ODD as the output. Once trained on the training data, the machine learning model predicts the frequency of the simulation scenario in the ODD as a function of the set of features of the simulation scenario. In this way, similar simulation scenarios, as judged by the similarity of their feature set, get similar frequencies. In some implementations, the moment matching engine 204 uses the MaxEnt method to infer a distribution over the set of simulation scenarios with statistics (e.g., expected feature values) matching that of the ODD. The MaxEnt method mitigates overfitting of the model in two ways. First, the SIM frequencies are predicted as a function of their features. For example, if the predictor is a smooth function of the features and similarity in feature space correlates with similarity in frequency, then prediction of the SIM frequencies as a function of the features acts as a regularization that reduces the overfitting of the model. Secondly, the maximum entropy distribution of weights that satisfies the moment matching constraints is explicitly selected in the MaxEnt method.

The MaxEnt method may be thought of as attempting to assign a probability $p_i$ to each simulation scenario i according to the likelihood of scenes with similar or analogous features occurring in the real world. Specifically, given features $F_{ij}$ of a simulation scenario i, the moment matching engine 304 finds a model using MaxEnt method such that the expected feature statistics under the model match those of the real world. This moment matching constraint is alternatively represented as shown below.

$$\Sigma_i p_i F_{ij} = \hat{F}_j, \forall j$$

where $\hat{F}_j$ is the empirical real-world feature statistics for event type j.

Figure 5A:
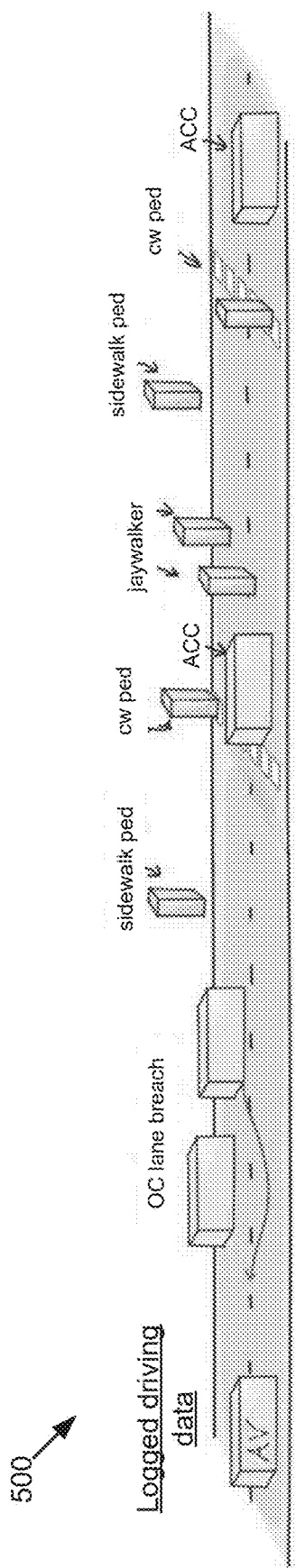
FIG. 5A is a diagram of a sequence of logged driving data in the real world according to some implementations.
Figure 5B:
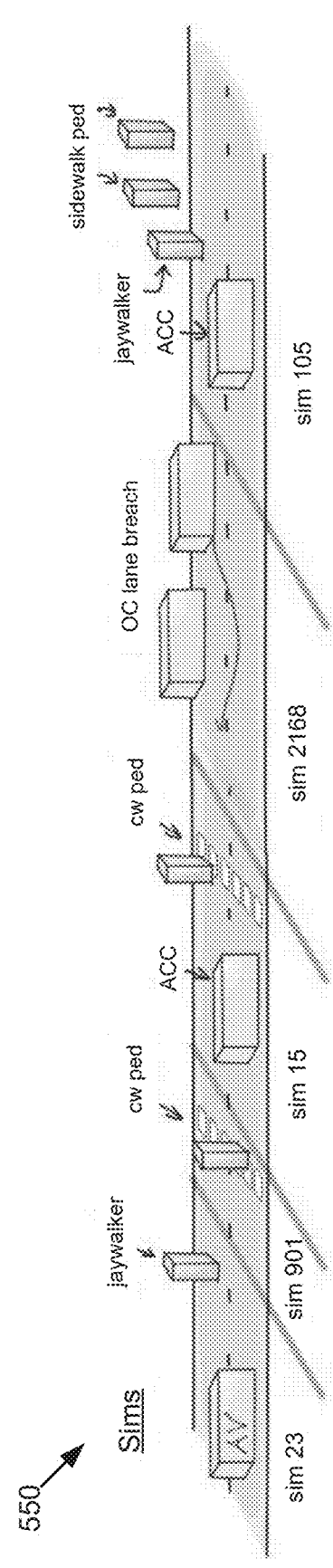
FIG. 5B is a diagram of a model built from simulated experiences to mimic the sequence of logged driving data according to some implementations.

The model derived using the MaxEnt method may fail to account for the rate-based nature of features. For example, the model built by the MaxEnt method may regard a simulation scenario with 100 pedestrians per mile to be equivalent to one with 1 pedestrian per mile. This is because the model may count the features (e.g., number of pedestrians) in the simulation scenario without normalizing the count by the length of the simulation (e.g., miles traversed by the autonomous vehicle 100 in the simulation). As such, the model may regard a simulation of length one mile with 100 pedestrians as containing a representation of features equivalent to a simulation of length 100 miles with 1 pedestrian per mile. Typically, miles and miles of driving have to occur out in the real world before events are randomly encountered by the autonomous vehicle 100 during those miles of driving. The moment matching engine 304 implements a rate-based model that reflects this structure by accounting for rate-based features. For example, the moment matching engine 304 explicitly models the autonomous vehicle 100 driving a number of miles with events randomly happening during the drive and selects the model so that those random events happen in the simulation at a rate matching the rate at which they are observed as happening in the real world. The rate-based model identifies that simulations may have different lengths and uses this information to conceptually "string together" multiple simulations to create one long simulation where the rate of features (e.g., number of pedestrians per mile) observed in the simulation matches the rate of features observed in the real-world driving data. FIG. 5A illustrates a diagram 500 of a sequence of logged driving data in the real world accordance with some implementations. In FIG. 5A, the diagram 500 depicts feature rates of events observed in the training data. For example, there are two crosswalk pedestrians, two sidewalk pedestrians, two jaywalkers, and a lane breach by an actor in the sequence of logged driving data. FIG. 5B illustrates a diagram 550 of a representation of a model built from simulated experiences to mimic the sequence of logged driving data. The goal of the model may be defined as building a virtual obstacle course from simulated experiences for the autonomous vehicle 100. In FIG. 5B, the diagram 550 depicts a virtual obstacle course built from example simulations: 'sim 105,' 'sim 2168,' 'sim 15,' sim 901,' and 'sim 23.' The virtual obstacle course may be considered as being similar to the training data in that it reproduces the feature rates of events observed in the training data. That is, the model specifies to the autonomous vehicle 100 how many miles to drive in each of the simulations so as to best mimic the sequence of logged driving data in the ODD. The model may be considered to be good at mimicking when it matches all the rates of events observed in the sequence of logged driving data. For example, if two jaywalkers are observed per 100 miles in the sequence of logged driving data, then the autonomous vehicle 100 should encounter two jaywalkers in the course of driving 100 miles in the simulated experiences. It should be understood that the term "virtual obstacle course" does not imply continuity between the simulations and the state of the autonomous vehicle 100 is reset between the simulations.

The moment matching engine 304 attempts to find the model using the MaxEnt method—a distribution over the simulation scenarios by solving the optimization problem shown below.

$$\max_p -\Sigma_i p_i \log p_i \text{ subject to } \Sigma_i p_i F_{ij} = \hat{F}_j, \forall j$$

The objective function of the optimization problem may be varied, with maximum entropy being a powerful tool. In some implementations, the moment matching engine 304 implements the rate-based model via a simple change to the training data by redefining the features to be the difference in the observed versus expected feature or event counts. The moment matching constraint in the previous equation is changed to reproduce the observed rates. Let $d_i$ represent the distance traveled in simulation scenario i and $r_j$ represent the empirical rate observed for event type j, the new constraints may then be represented by the following equation:

$$\frac{\sum_i p_i F_{ij}}{\sum_i p_i d_i} = r_j, \forall j$$

This equation may be rewritten as:

$$\Sigma_i p_i (F_{ij} - r_j d_i) = 0, \forall j$$

As such, the new rate-based model may be implemented by replacing the old features $F_{ij}$ with the difference between the observed and expected feature counts $(F_{ij} - r_j d_i)$, and replacing the old empirical moment $\hat{F}_j$ with 0. In practice, there may be uncertainty bounds on the rate-based features. The moment matching engine 304 accounts for this uncertainty by relaxing the moment matching constraints to allow expected values of rate-based features to match in the distributions under ODD-relevant scenario and the model based on MaxEnt method within a certain threshold range of uncertainty. In some implementations where the uncertainty can be quantified in the form of confidence intervals, relaxing the moment matching constraints to incorporate this information is equivalent to adding L1 regularization to each parameter, where the coefficient of each regularization term is equal to the size of the confidence interval. Given a number of miles of training data (in the form logged data 211), one way to obtain the confidence intervals is to assume the events follow a stationary Poisson process. In this case, assuming that the true rate of some event is r, and there are T miles of data, then the number of events encountered in T miles of driving is distributed as Poisson with rate parameter rT. If the expected number of events rT is greater than some number (e.g., around 5), then the number of events encountered is approximately Gaussian with mean rT and variance rT. A simple confidence interval for the observed number of events encountered in T miles of driving is $rT \pm 3\sqrt{rT}$. Conversely, if n events are observed, then the true expected number of events may be in the interval $n \pm 3\sqrt{n}$. Since the constraint values have units of event counts, a confidence interval of $3\sqrt{n}$ for each constraint may be assumed. The uncertainty bounds on the rate-based features may be expressed in terms of event counts. For example, the constraints may be of the form "the expected number of events under the model should deviate from that under the ODD by no more than $\pm 3\sqrt{n}$ events." If the number of observed events is fewer than some number (e.g., 5 or so), then the Gaussian approximation breaks down. In case the number of observed events is exactly zero, then maximizing the true expected number of events subject to the probability of observing zero events ($e^{-r}$) being at least some e may be considered. For example, this yields $rT \leq 4.61$ for $\epsilon = 0.01$. Therefore, a simple way to handle the breakdown in the Gaussian approximation may be to set a size of the confidence interval equal to max ($\epsilon, 3\sqrt{n}$).

In some implementations, the moment matching engine 304 solves the convex optimization problem of computing weights for the set of simulation scenarios using density ratio estimation. Let model(s) be the fixed model distribution over the plurality of simulation scenarios including independent and identically distributed samples. For example, this fixed model distribution may be a uniform distribution over the plurality of simulation scenarios. Let real(s) be the ODD distribution including independent and identically distributed samples. To estimate the AV performance metric in the real world given samples from a fixed model distribution, the moment matching engine 304 uses importance-sampling estimator to estimate the fraction $$\frac{\text{Real}(s)}{\text{Model}(s)}$$

in the below equation:

$$E_{s \sim real}[c(s)] \approx E_{s \sim model}\left[\frac{\text{Real}(s)}{\text{Model}(s)} c(s)\right]$$

If Model(s) is the uniform distribution, then estimating the fraction is equivalent to estimating Real(s) directly. In some implementations, the moment matching engine 304 uses a classification algorithm to calculate weights though density ratio estimation. For example, logistic regression may be used to calculate weights through density ratio estimation. The weight for each simulation scenario may be expressed as:

$$w(s_j) = \frac{n_{model}}{n_{real}} e^{\Sigma_i f_i(s_j)\theta_i}$$

where $n_{model}$ and $n_{real}$ refer to the number of samples in the model distribution and the ODD distribution respectively. The parameter $\theta_i$ is learned by labeling the samples from real(s) distribution as +1 and the samples from model(s) distribution as −1 and training a maximum a posteriori (MAP) on the labels.

In some implementations, the moment matching engine 304 facilitates with building the diverse set of simulation scenarios that are sufficient to cover all the cases of interest that may happen in the ODD. The moment matching engine 304 measures the coverage of the set of simulation scenarios based on whether moment matching of features between the ODD-relevant scenario and the set of simulation scenarios is successful. The coverage is a metric that identifies the part of the "scenario space" in which the autonomous vehicle 100 may be tested in simulations. For example, if there are no examples of simulation scenarios covering cases of red-light traffic runners and logged data of such cases occurring in the ODD is present, the moment matching engine 304 may not be able to match the expected feature counts between the distributions. The moment matching engine 304 determines whether a threshold number of simulation scenarios with significant weights is sufficiently present in the set of simulation scenarios to correctly estimate the performance metric of interest. The moment matching engine 304 identifies areas in the "scenario space" where it is determined that it is not possible to match real-world statistics for moment matching and/or where the number of simulation scenarios with significant weights is small. In another example, if a situation of an autonomous vehicle 100 rear ending another vehicle is absent as an event in the logged data collected in the ODD but a set of simulation scenarios cover such an event, the moment matching engine 304 may not perform moment matching for this event. However, the moment matching engine 304 identifies certain features predictive of rear ending event, such as speed limit, presence of a lead actor cutting in front of the autonomous vehicle, etc. observable in the ODD that may be moment matched with the set of simulation scenarios in order to enable estimating the likelihood of the autonomous vehicle 100 rear ending as a performance metric solely from the simulations.

The metrics engine 306 estimates the expected value of a performance metric of interest for the autonomous vehicle 100 in the real world based on the weight determined for each simulation scenario in the set by the moment matching engine 304. The metrics engine 306 determines the value of the performance metric of interest c(s) estimated for the autonomous vehicle 100 in the simulations executed for each scenario in the set of simulation scenarios by the simulation execution engine 206. The metrics engine 306 estimates the expected value of the performance metric of interest for the autonomous vehicle 100 in the real world $E_{s \sim Real}[c(s)]$ by weighting the value of the performance metric of interest from the simulations using the weight of each simulation scenario in the set. This is expressed as shown below:

$$E_{s \sim real}[c(s)] \approx E_{s \sim model}[w(s)c(s)]$$

The metrics engine 306 estimates confidence intervals around the expected value of the performance metric of interest for the autonomous vehicle in the real world. For example, the metrics engine 306 estimates the confidence intervals using a technique from a group of variance estimation, central limit theorem, and Hoeffding's inequality. The metrics engine 306 may generate and store performance metrics associated with validating the autonomous vehicle 100 in the AV performance metrics 217.

The techniques described herein of assigning weights to the set of simulation scenarios in accordance with their occurrence under ODD-relevant scenario enable random sampling of a simulation scenario in proportion to its representation in the real world and evaluating the behavior of the autonomous vehicle 100 in a corresponding simulation to obtain a sample of how the autonomous vehicle 100 may behave in a real-world situation. This capability to sample the behavior of the autonomous vehicle 100 in the real world without actually running it in the real world is useful because it enables the estimation of statistics or performance metrics for the autonomous vehicle 100 that would otherwise be prohibitively expensive to obtain in the real world. For example, suppose a performance metric—the probability that the autonomous vehicle hits a curb while on a typical drive in an ODD needs to be estimated. An existing solution might be to run 10 development tests in the real world and get an observation that the autonomous vehicle 100 never hits a curb. It would be difficult to conclude from those 10 samples about the probability of hitting a curb when the autonomous vehicle 100 may be driven 100,000 miles in the ODD. Mathematically, an upper bound on the latter probability may be determined given the 10 samples. This bound will decrease as the number of samples (assuming the autonomous vehicle 100 never hits the curb in any of the examples) increases, but running the autonomous vehicle in the real world is expensive. Therefore, a smaller (approximate) range of confidence intervals for performance metrics of interest may be rapidly and cheaply obtained by running the autonomous vehicle 100 on many examples of typical situations in simulations than that which could be obtained through real-world driving alone. In order to estimate the confidence intervals, the performance validation engine 208 facilitates with building a pool of independent, identically distributed samples from a distribution approximating the real distribution by running many simulations from the learned model distribution over the set of simulation scenarios. Independent samples is the key. For example, if a long simulation is run and split into chunks for use as samples, it would not satisfy the independence criteria for the samples.

As shown in FIG. 2, the computing system 172 includes a machine learning engine 166 to train one or more machine learning models 224. In some implementations, the machine learning engine 166 receives the training data from the performance validation system 160 for training the machine learning model 224. For example, the training data may include features from the set of ODD route snippets and a categorization of OE, VM, and OEDR tags provided for each ODD route snippet. The machine learning engine 166 trains a machine learning model 224 by using an input set of the training statistics of the ODD and validating a performance of the machine learning model 224 on a set of held-out statistics of the ODD. The held-out statistics of the ODD may relate to the performance of the autonomous vehicle. For example, the machine learning engine 166 applies leave-one-out cross-validation to validate the performance of the machine learning model 224. For each of the ODD feature statistics, the machine learning engine 166 holds that statistic out of the training set, trains the model 224 using all the other ODD feature statistics, and then evaluates the performance of the model 244 on predicting the held-out statistic.

As shown in FIG. 2, once the performance validation system 160 has weighted the simulation scenarios as suitable for training the machine learning model 224, the machine learning engine 166 may train the machine learning model 224 using the weighted simulation scenarios as training examples. In some implementations, the absence of assignment of significant weight to the simulation scenario may disqualify the corresponding simulation scenario and its simulation data for use in training the machine learning model 224 of the autonomous vehicle 100. In some implementations, the machine learning model 224 is a neural network model and includes a layer and/or layers of memory units where memory units each have corresponding weights. A variety of neural network models can be utilized including feed forward neural networks, convolutional neural networks, recurrent neural networks, radial basis functions, other neural network models, as well as combinations of several neural networks. Additionally, or alternatively, the machine learning model 224 can represent a variety of machine learning techniques in addition to neural networks, for example, support vector machines, decision trees, Bayesian networks, random decision forests, k-nearest neighbors, linear regression, least squares, other machine learning techniques, and/or combinations of machine learning techniques.

Machine learning models 224 may be trained for a variety of autonomous vehicle tasks including determining a target autonomous vehicle location, generating one or more signals to control an autonomous vehicle, tracking or identifying objects within the environment of an autonomous vehicle, etc. For example, a neural network model may be trained to identify traffic lights in the environment with the autonomous vehicle 100. As a further example, a neural network model may be trained to predict the make and model of other vehicles in the environment with the autonomous vehicle 100. In many implementations, neural network models may be trained to perform a single task. In other implementations, neural network models may be trained to perform multiple tasks.

The machine learning engine 166 may generate training instances from the simulation scenarios to train the machine learning model 224. A training instance can include, for example, an instance of simulated autonomous vehicle data where the autonomous vehicle 100 can detect a stop sign using the simulated sensor data from one or more sensors and a label corresponding to a simulated output corresponding to bringing the autonomous vehicle to a stop in the simulation scenario. The machine learning engine 166 may apply a training instance as input to machine learning model 224. In some implementations, the machine learning model 224 may be trained using any one of at least one of supervised learning (e.g., support vector machines, neural networks, logistic regression, linear regression, stacking, gradient boosting, etc.), unsupervised learning (e.g., clustering, neural networks, singular value decomposition, principal component analysis, etc.), or semi-supervised learning (e.g., generative models, transductive support vector machines, etc.). Additionally, or alternatively, machine learning models in accordance with some implementations may be deep learning networks including recurrent neural networks, convolutional neural networks (CNN), networks that are a combination of multiple networks, etc. For example, the machine learning engine 166 may generate a predicted machine learning model output by applying training input to the machine learning model 224. Additionally, or alternatively, the machine learning engine 166 may compare the predicted machine learning model output with a machine learning model known output (e.g., simulated output in the simulation scenario) from the training instance and, using the comparison, update one or more weights in the machine learning model 224. In some implementations, one or more weights may be updated by backpropagating the difference over the entire machine learning model 224.

The machine learning engine 166 may test a trained machine learning model according to some implementations. The machine learning engine 166 may generate testing instances using the simulation scenario and the simulated autonomous vehicle in the simulation scenario performing the specific autonomous vehicle task for which the machine learning model 224 is trained. The machine learning engine 166 may apply a testing instance as input to the trained machine learning model 224. A predicted output generated by applying a testing instance to the trained machine learning model 224 may be compared with a known output for the testing instance (i.e., a simulated output observed in the simulation) to update an accuracy value (e.g., an accuracy percentage) for the machine learning model 224.

Figure 6:
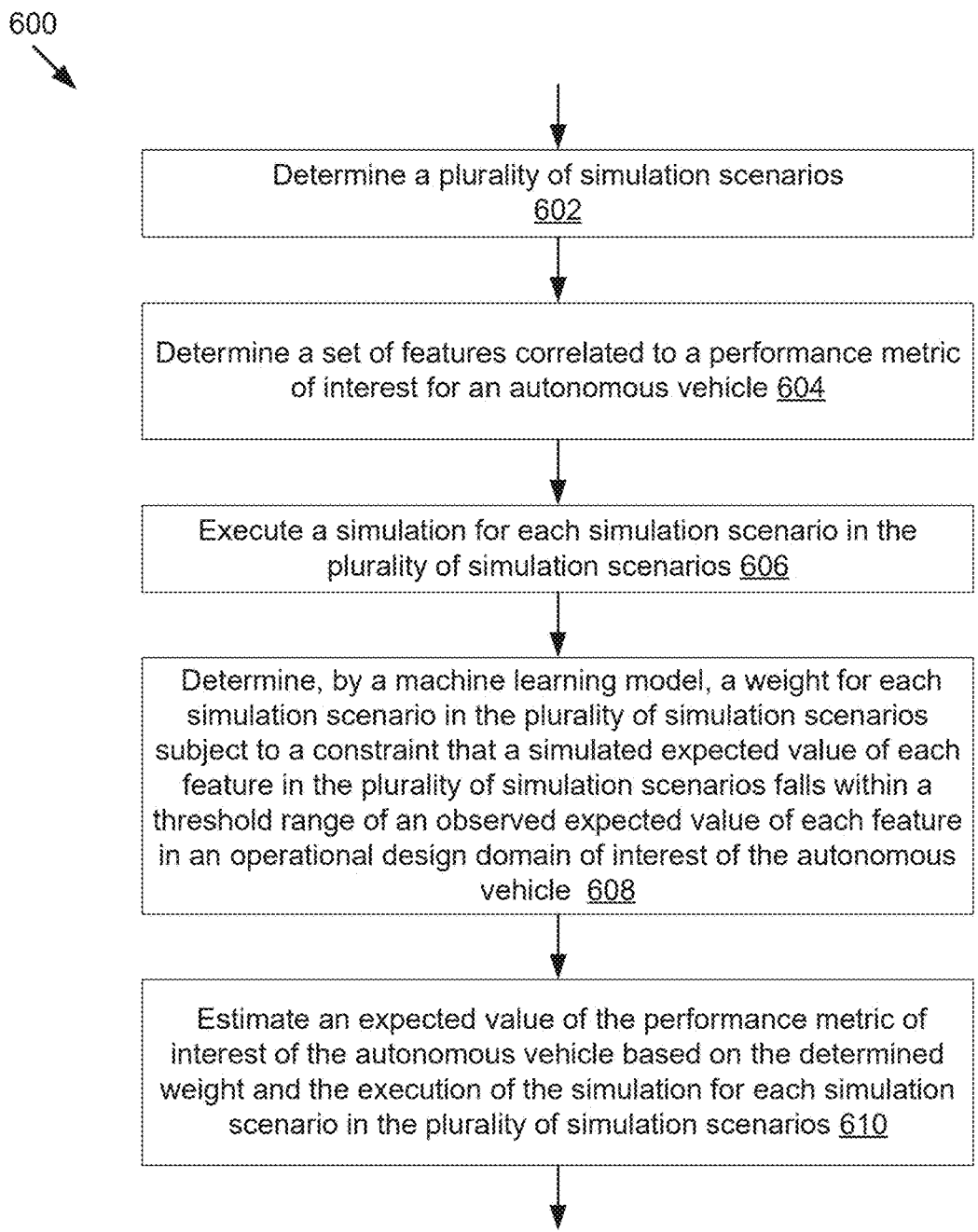
FIG. 6 is a flow chart illustrating a method of validating a performance of an autonomous vehicle in the real world based on a set of simulation scenarios according to some implementations.

Referring now to FIG. 6, a method 600 of validating a performance of an autonomous vehicle in the real world based on a set of simulation scenarios in accordance with an implementation is illustrated. The method 600 may be a sequence of operations or process steps performed by an autonomous vehicle, by another computer system that is separate from the autonomous vehicle (e.g., cloud-based computing system 172 of FIG. 1), or any combination thereof. Moreover, while in some implementations, the sequence of operations may be fully automated, in other implementations some steps may be performed and/or guided through human intervention. Furthermore, it will be appreciated that the order of operations in the sequence may be varied, and that some operations may be performed in parallel and/or iteratively in some implementations.

In block 602, a plurality of simulation scenarios is determined. For example, the plurality of simulation scenarios may be a base set of simulation scenarios that is sufficiently diverse to model a set of real-world situations with which the behavior of the autonomous vehicle 100 can be tested.

In block 604, a set of features is determined. The set of features correlates to a performance metric of interest for the autonomous vehicle. For example, the set of features may be concise and predictive of the desired performance metric in the real world.

In block 606, a simulation for each simulation scenario in the plurality of simulation scenario is executed. For example, a simulation scenario may be selected for a simulation run to validate the performance of the autonomous vehicle in a test. A configuration of the simulation scenario is fetched from the simulation registry 214 and executed by the simulation execution engine 206.

In block 608, a weight for each simulation scenario in the plurality of simulation scenarios is determined by a machine learning model subject to a constraint that a simulated expected value of each feature in the plurality of simulation scenarios falls within a threshold range of an observed expected value of each feature in an operational design domain of interest of the autonomous vehicle. For example, the computation of weights for each of the plurality of simulation scenarios may be a convex optimization problem. The moment matching engine 304 may solve the convex optimization problem using maximum entropy (MaxEnt) modeling. For example, the moment matching engine 304 may maximize the entropy of the Gibbs distribution over strategies implied by the weights using the MaxEnt algorithm (machine learning method) such that the weights are as close to the uniform distribution as possible, subject to the moment matching constraints that the resulting model distribution matches the real-world statistics within a threshold range.

In block 610, an expected value of the performance metric of interest of the autonomous vehicle is estimated based on the determined weight and the execution of the simulation for each simulation scenario in the plurality of simulation scenarios. For example, the metrics engine 306 estimates the expected value of the performance metric of interest for the autonomous vehicle 100 in the real world by weighting the value of the performance metric of interest obtained from the simulations using the weight of each simulation scenario in the set of simulation scenarios.

Figure 7:
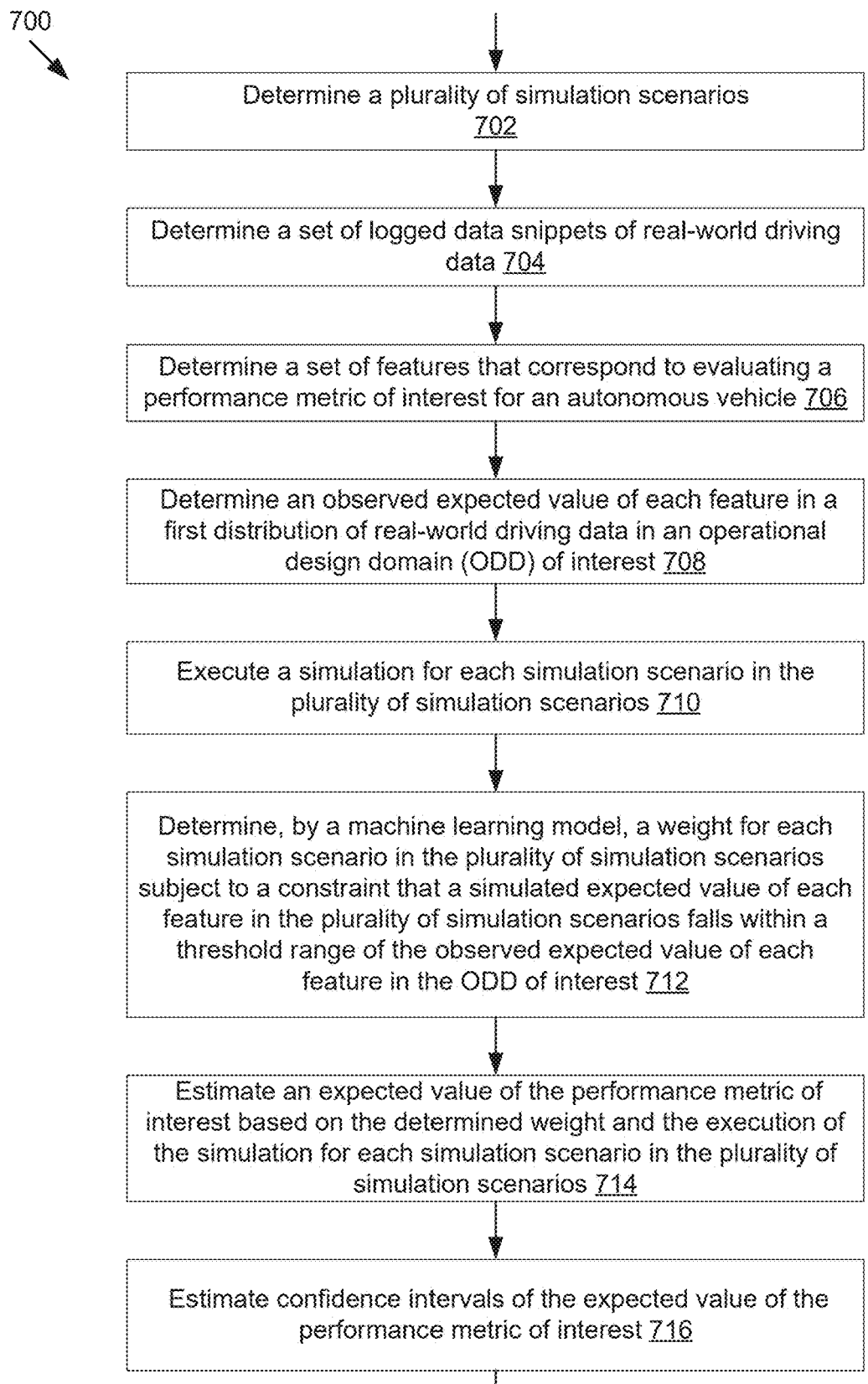
FIG. 7 is a flow chart illustrating another method of validating a performance of an autonomous vehicle in the real world based on a set of simulation scenarios according to some implementations.

Referring now to FIG. 7, another implementation of a method 700 of validating a performance of an autonomous vehicle in the real world based on a set of simulation scenarios is illustrated.

In block 702, a plurality of simulation scenarios is determined. For example, a simulation scenario may correspond to an instantiation of a three-dimensional world mimicking a behavior and sensor configuration of an autonomous vehicle in its encounter with other vehicles, pedestrians, and surrounding environment.

In block 704, a set of logged data snippets of real world driving data is determined. In some implementations, the ODD data generator 202 may process and convert the time stamped vehicle logged data 211 collected along an ODD route in the real world into a set of logged data snippets or ODD route segments. Each data snippet in the set may include an event encountered by the autonomous vehicle 100.

In block 706, a set of features that correspond to evaluating a performance metric of interest for an autonomous vehicle is determined. For example, the set of features may also correspond to what is important for simulation coverage evaluation. In another example, the set of features that is preserving of the statistics empirically observed in ODD data is determined.

In block 708, an observed expected value of each feature from the set is determined in a first distribution of real-world driving data in an operational design domain (ODD) of interest. In some implementations, the feature identification engine 302 may randomly sample the set of logged data snippets of real world driving data and estimate the observed expected value of each feature. The observed expected value of a feature may be modified by user input if specific deviations from nominal driving is desired. For example, the expected value of feature, such as "presence of stop sign" may be manually set to 1.0 for moment matching with simulation scenarios exclusively having stop signs in them.

In block 710, a simulation for each simulation scenario in the plurality of simulation scenarios is executed. In some implementations, the simulation execution engine 206 may generate a simulation result and/or a simulation log during the execution of the simulation and store it in the simulation log 215. The simulation result and/or a simulation log may be one or more formatted messages including or encoded with state information of the autonomous vehicle 100 and other actors observed in the simulation. For example, the state information may include detection of events associated with the autonomous vehicle 100, such as false positives, hard braking, slow downs, and other potential critical events observed in the simulation run.

In block 712, a weight for each simulation scenario in the plurality of simulation scenarios is determined by a machine learning model subject to a constraint that a simulated expected value of each feature in the plurality of simulation scenarios falls within a threshold range of the observed expected value of each feature in an ODD of interest of the autonomous vehicle. The constraint may include that a rate of occurrence of each feature in the set of features between the ODD of interest and the set of simulation scenarios is matched within a threshold range. For example, if two jaywalkers are observed per 100 miles in the sequence of logged driving data, then the autonomous vehicle 100 should encounter two jaywalkers in the course of driving 100 miles in the simulated experiences under the model distribution.

In block 714, an expected value of the performance metric of interest of the autonomous vehicle is estimated based on the determined weight and the execution of the simulation for each simulation scenario in the plurality of simulation scenarios. For example, the estimation of the performance metrics of the autonomous vehicle 100 in the ODD-relevant scenario may be determined by weighting the performance metrics of the autonomous vehicle 100 in the simulation by the simulation scenario's estimated "true" frequency in the ODD-relevant scenario.

In block 716, confidence intervals of the expected value of the performance metric of interest is estimated. In one example, the metrics engine 306 estimates the variance $Var_{s\sim model}[w(s)c(s)]$ of expected value of the performance metric and determines the confidence intervals from it.

The previous description is provided to enable practice of the various aspects described herein. Various modifications to these aspects will be understood, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable others to make or use the disclosed subject matter. Various modifications to these implementations will be readily apparent, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated, the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be implemented in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable others to make or use the present disclosure. Various modifications to these examples will be readily apparent, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for evaluating the performance of an autonomous vehicle, the method comprising:
   determining a plurality of simulation scenarios;
   determining a set of features correlated to a performance metric of interest for the autonomous vehicle;
   executing a simulation of each simulation scenario in the plurality of simulation scenarios;
   determining, by a first machine learning model, a weight for each simulation scenario in the plurality of simulation scenarios including maximizing an entropy of weight distribution over the plurality of simulation scenarios subject to satisfying a constraint that a simulated expected value of each feature in the plurality of simulation scenarios falls within a threshold range of an observed expected value of each feature in an operational design domain of interest of the autonomous vehicle;
   estimating an expected value of the performance metric of interest of the autonomous vehicle based on the determined weight and the execution of the simulation of each simulation scenario in the plurality of simulation scenarios;
   training a second machine learning model associated with one or more control subsystems of the autonomous vehicle based on the determined weight and simulated data of each simulation scenario in the plurality of simulation scenarios; and
   performing, using the trained second machine learning model associated with the one or more control subsystems of the autonomous vehicle, an autonomous driving task by the autonomous vehicle during a real-world operation of the autonomous vehicle.

2. The method of claim 1, further comprising:
determining a set of logged data snippets of real-world driving data;
executing a simulation based on the set of logged data snippets; and
determining the observed expected value of each feature in the set of features in the operational design domain of interest based on the execution of the simulation.

3. The method of claim 1, further comprising estimating confidence intervals of the expected value of the performance metric of interest of the autonomous vehicle using one from a group of variance estimation, central limit theorem, and Hoeffding's inequality.

4. The method of claim 1, wherein estimating the expected value of the performance metric of interest of the autonomous vehicle further comprises:
estimating the performance metric of interest of the autonomous vehicle from the execution of the simulation of each simulation scenario in the plurality of simulation scenarios; and
weighting the estimated performance metric of interest using the determined weight of each simulation scenario in the plurality of simulation scenarios.

5. The method of claim 1, wherein first machine learning model is a maximum entropy model.

6. The method of claim 1, wherein determining the weight for each simulation scenario in the plurality of simulation scenarios subject to the constraint further comprises:
determining, by the first machine learning model, the weight for each simulation scenario in the plurality of simulation scenarios subject to the constraint that a simulated rate of occurrence of each feature in the plurality of simulation scenarios falls within a threshold range of an observed rate of occurrence of each feature in the operational design domain of interest of the autonomous vehicle.

7. The method of claim 1, wherein the threshold range of the observed expected value of each feature in the operational design domain of interest of the autonomous vehicle is based on uncertainty bounds corresponding to each feature.

8. The method of claim 1, wherein the weight for each simulation scenario is a function of one or more features of each simulation scenario.

9. The method of claim 1, wherein a feature in the set of features is a grouping of attributes associated with one or more of a simulation scenario and a logged data snippet of real-world driving data.

10. The method of claim 9, wherein the grouping of attributes associated with one or more of the simulation scenario and the logged data snippet of the real-world driving data includes one or more of an operating environment, a vehicle maneuver, and an actor.

11. A system comprising one or more processors and memory operably coupled with the one or more processors, wherein the memory stores instructions that, in response to the execution of the instructions by one or more processors, cause the one or more processors to perform operations including:
determining a plurality of simulation scenarios;
determining a set of features correlated to a performance metric of interest for an autonomous vehicle;
executing a simulation of each simulation scenario in the plurality of simulation scenarios;
determining, by a first machine learning model, a weight for each simulation scenario in the plurality of simulation scenarios including maximizing an entropy of weight distribution over the plurality of simulation scenarios subject to satisfying a constraint that a simulated expected value of each feature in the plurality of simulation scenarios falls within a threshold range of an observed expected value of each feature in an operational design domain of interest of the autonomous vehicle;
estimating an expected value of the performance metric of interest of the autonomous vehicle based on the determined weight and the execution of the simulation of each simulation scenario in the plurality of simulation scenarios;
training a second machine learning model associated with one or more control subsystems of the autonomous vehicle based on the determined weight and simulated data of each simulation scenario in the plurality of simulation scenarios; and
performing, using the trained second machine learning model associated with the one or more control subsystems of the autonomous vehicle, an autonomous driving task by the autonomous vehicle during a real-world operation of the autonomous vehicle.

12. The system of claim 11, wherein the operations further comprise:
determining a set of logged data snippets of real-world driving data;
executing a simulation based on the set of logged data snippets; and
determining the observed expected value of each feature in the set of features in the operational design domain of interest based on the execution of the simulation.

13. The system of claim 11, wherein the operations further comprise estimating confidence intervals of the expected value of the performance metric of interest for the autonomous vehicle using one from a group of variance estimation, central limit theorem, and Hoeffding's inequality.

14. The system of claim 11, wherein estimating the expected value of the performance metric of interest of the autonomous vehicle further comprises:
estimating the performance metric of interest of the autonomous vehicle from the execution of the simulation of each simulation scenario in the plurality of simulation scenarios; and
weighting the estimated performance metric of interest using the determined weight of each simulation scenario in the plurality of simulation scenarios.

15. The system of claim 11, wherein the first machine learning model is a maximum entropy model.

16. The system of claim 11, wherein determining the weight for each simulation scenario in the plurality of simulation scenarios subject to the constraint further comprises:
determining, by the first machine learning model, the weight for each simulation scenario in the plurality of simulation scenarios subject to the constraint that a simulated rate of occurrence of each feature in the plurality of simulation scenarios falls within a threshold range of an observed rate of occurrence of each feature in the operational design domain of interest of the autonomous vehicle.

17. The system of claim 11, wherein the threshold range of the observed expected value of each feature in the operational design domain of interest of the autonomous vehicle is based on uncertainty bounds corresponding to each feature.

18. The system of claim 11, wherein the weight for each simulation scenario is a function of one or more features of each simulation scenario.

19. The system of claim 11, wherein a feature in the set of features is a grouping of attributes associated with one or more of a simulation scenario and a logged data snippet of real-world driving data.

20. The system of claim 19, wherein the grouping of attributes associated with one or more of the simulation scenario and the logged data snippet of the real-world driving data includes one or more of an operating environment, a vehicle maneuver, and an actor.

* * * * *